United States Patent

[11] 3,580,117

| [72] | Inventor | Stefan Sarzinski<br>Sarajevo, Yugoslavia |
|---|---|---|
| [21] | Appl. No. | 802,893 |
| [22] | Filed | Feb. 27, 1969 |
| [45] | Patented | May 25, 1971 |
| [73] | Assignee | "Zrak"-Preduzece Precizne mehanike i optike<br>Sarajevo, Yugoslavia |
| [32] | Priority | Apr. 25, 1968 |
| [33] | | Yugoslavia |
| [31] | | P-989/68 |

[54] TOOL CARRIER ASSEMBLY FOR A LATHE OR OTHER MACHINE TOOL
8 Claims, 14 Drawing Figs.

[52] U.S. Cl. ........................ 82/36, 29/98
[51] Int. Cl. ........................ B23b 29/00, B26d 1/12
[50] Field of Search ........................ 29/96, 97, 98; 82/35, 36, 37

[56] References Cited
UNITED STATES PATENTS

| 2,428,508 | 10/1947 | Weigle et al. | 82/36 |
| 3,326,070 | 6/1967 | Muller | 84/36 |

FOREIGN PATENTS

| 536,654 | 12/1955 | Italy | 82/36 |
| 601,642 | 2/1960 | Italy | 82/36 |
| 118,043 | 1/1947 | Sweden | 82/37 |
| 243,636 | 1/1947 | Switzerland | 82/37 |

*Primary Examiner*—Harrison L. Hinson
*Attorney*—Waters, Roditi, Schwartz & Nissen

ABSTRACT: According to the present invention, there is provided a tool carrier assembly for a lathe or other machine tool, such assembly comprising a substantially circular body, a removable tool carrier having means to clamp a tool thereto, and a circular concave surface adapted to a cooperate with the outer surface of the body, at least two axially extending, circumferentially spaced apart, interengageably keys and grooves being formed on the circular surfaces of the body and tool carrier and means to cause relative movement between one of the grooves and its associated key to secure the tool carrier to the body.

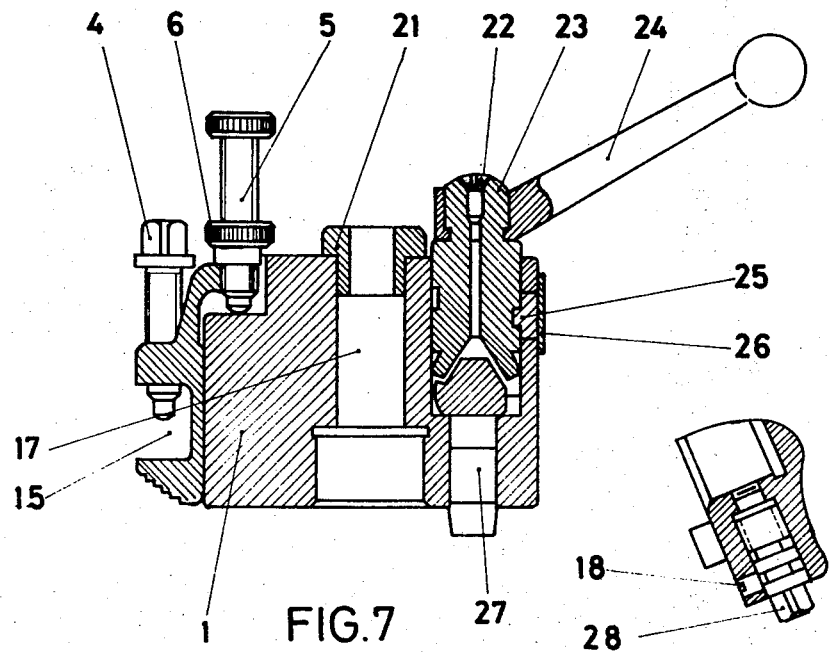
FIG.7
FIG.9
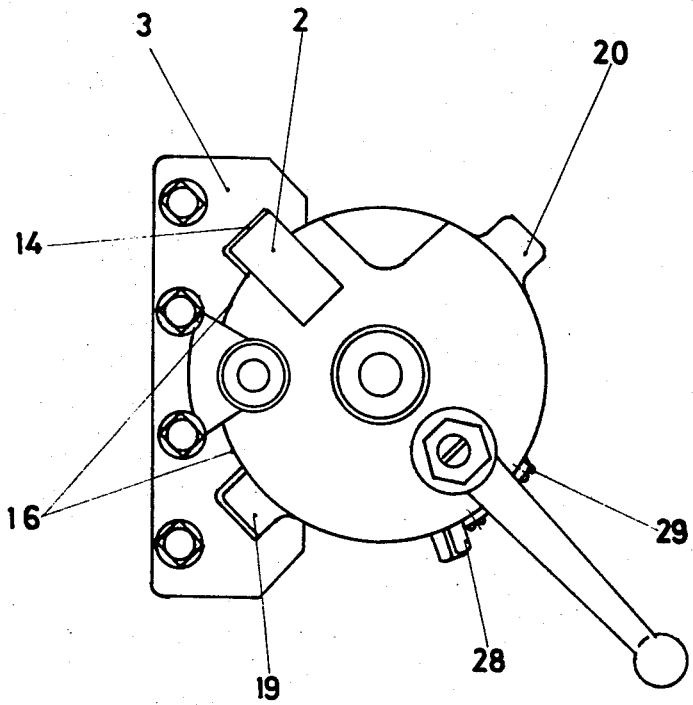
FIG.8

TOOL CARRIER ASSEMBLY FOR A LATHE OR OTHER MACHINE TOOL

BACKGROUND

The present invention relates to tool carrier assemblies for lathes or other machine tools.

Conventional tool carriers include a square lower plate securable to a toolpost and a square upper plate which may move with respect thereto. Tools are clamped between the two plates, either by this movement or by clamping screws, to extend along the sides of the square, with the cutting portion of the tool extending beyond the carrier of the plate. This permits the assembly to carry four tools at the same time, rotation and subsequent clamping of the assembly bringing one of these tools to a position to machine the workpiece.

SUMMARY OF INVENTION

It is an object of the invention to provide an improved toolholder which effects the secure holding of tools for lathes and the like and which avoids chatter and other defects inherent in previously known toolholders.

In order to ensure that the cutting edge is on the axis of the chuck and therefore the workpiece, packing pieces are placed under the cutter. This gives rise to bending and vibration of the cutter and therefore "chatter" on the workpiece. It also makes the changing of a cutter a lengthy operation.

DRAWING

FIG. 2 is a top plan view of the assembly of FIG. 1;

Figure 1:
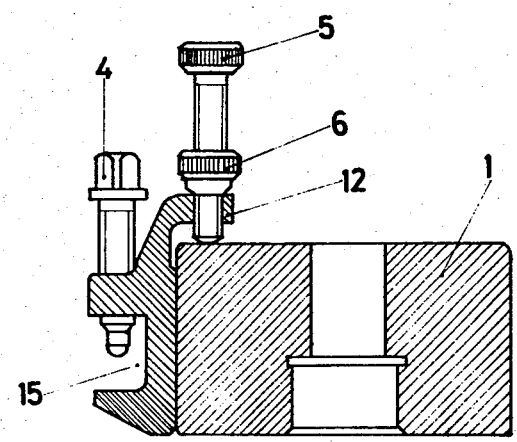
FIG. 1 is a sectional view, on line I-I of FIG. 2, of a tool carrier in accordance with one embodiment of the invention.
Figures 3A, 3B, 4, 5, 6:
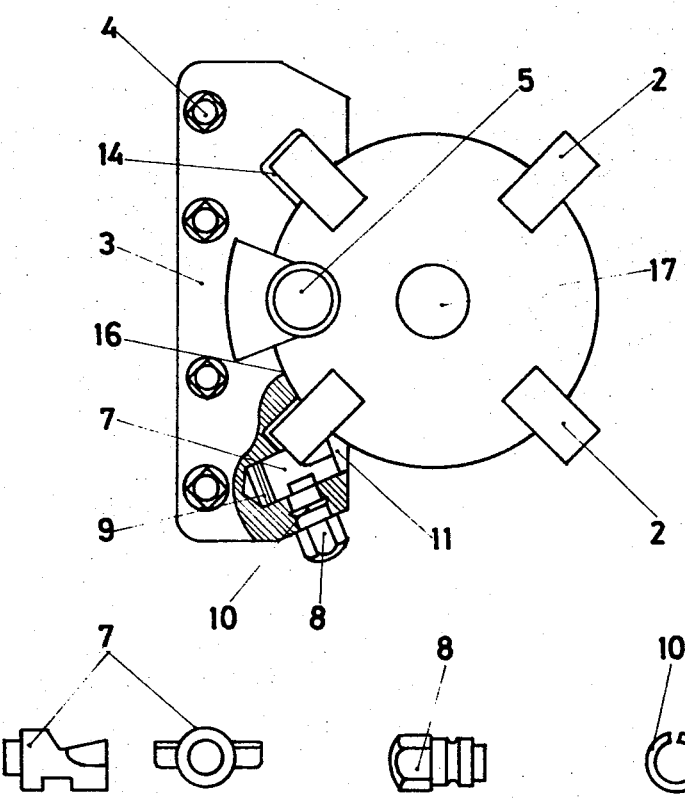
Figure 10:
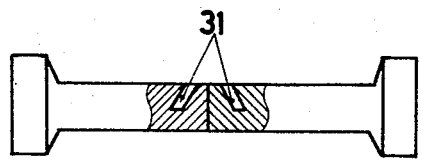
Figure 11:
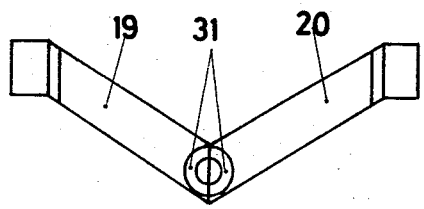
Figure 12:
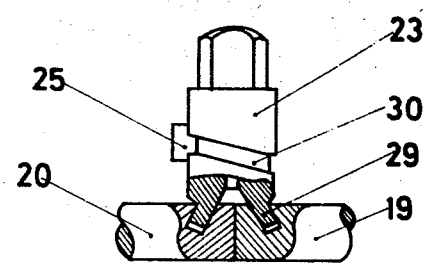
Figure 13:
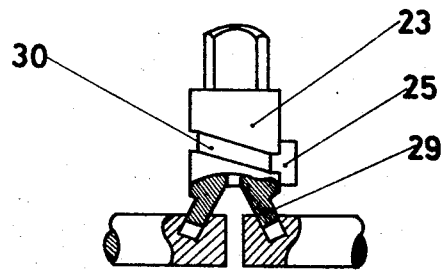

FIGS. 3a and 3b respectively shown an end and a side elevational view of a clamping dog used in the assembly of FIGS. 1 and 2;

FIGS. 4, 5 and 6 are respectively side elevational views of a clamp operating member, retaining circlip and clamping dog spring, of the assembly of FIGS. 1 and 2;

FIG. 7 is a sectional view on line VII–VII of FIG. 8, showing a second embodiment of the invention;

FIG. 8 is a top plan view of the assembly of FIG. 7;

FIG. 9 is a fragmentary sectional view showing the operating mechanism of a locking device of the main body of the assembly of FIGS. 7 and 8;

FIGS. 10 and 11 are respectively a side and a plan view of movable keys and supporting arms of the assembly of FIGS. 7 and 8; and FIGS. 12 and 13 are side elevational views, partly in section, of an operating cam for the arms of FIGS. 10 and 11, the views respectively showing two different positions.

DETAILED DESCRIPTION

Referring now to FIGS. 1 to 6, the assembly includes a generally circular, annular main body 1, having four, radially outwardly extending, fixed keys 2. Removably mounted on the body is a tool carrier 3, having four tool-clamping screws 4, the tool carrier being axially or vertically adjustable on the body 1 by means of an adjusting screw 12, which is provided with a knurled head 5 and lock nut 6.

The tool carrier 3 is formed with a circular concave surface 16, which conforms to the outer circular surface of the body 1, and is also provided with two radially extending grooves parallel to the axis of the body 1. These grooves accommodate two of the keys 2, part of one of the surfaces of the grooves being formed by a portion of a movable clamping dog 7, which is slidable in a cylindrical recess 11 in the tool carrier 3. A rotatable operating member 8 is retained in the carrier 3 by a circlip 10, while an eccentric on the inner end engages in a cutout portion of the clamping dog 7. Rotation of member 8 causes sliding of dog 7, which is engaged in its recess by a spring 9, this sliding effecting clamping of the carrier to the body 1.

In order to clamp the body 1 to the toolpost, a central aperture 17 is formed therein for the passage of a threaded bolt or pin. The tool itself (not shown) is secured by screws 4 in the opening 15 in the tool carrier 3.

The embodiment of FIGS. 7 to 13 is similar to that just described in that it includes a circular body 1, to which is removably fixed a tool carrier 3, which is vertically adjustable as before, the tool being clamped in opening 15 by screws 4. In this construction, there is only one fixed key 2, but there are two movable keys 19 and 20 carried on inwardly extending arms and meeting at a point where they are provided with semiannular slots 31 (see FIGS. 10 to 13). Engaging in these slots are downwardly divergent cam elements 29 formed on the lower end of an operating member 23 and rotatable by a handle 24. On its outer surface, member 23 is formed with a helical slot 30 in which engages an inward projection on a tongue member 25 which is retained by a strap 26 on the outside of body 1. Member 23 has an axial lubrication bore closed at the top by a bolt 22.

Rotation of handle 24 causes the member 23 to move up or down, so that the cam surfaces 29 cause the arms and keys 19 and 20 to move the effect clamping of the keys in the grooves 14 and, therefore, securing of he tool carrier 3.

Below the member 23 is a locking pin 27, having a toothed rack formation thereon, arranged by a pinion on the end of a rotatable rod 28 held in the body 1 by a setscrew 18. Rotation of rod 28 causes raising and lowering of the locking pin 27, which can thus selectively be engaged in one of number of opening in the toolpost, to select the rotational position of the body 1, which is held on the toolpost by a nut 21 threaded on a rod on the toolpost.

With the arrangement of the surfaces of the body 1 and tool carrier 3 which abut, vibration of the tool carrier is eliminated and the cutting face, acting on the cutting point of the tool, increases the contact between the abutting surfaces of the carrier and body 1. Control of the height of the tool can readily be effected by operation of members 5 and 6.

I claim:

1. A tool carrier assembly for a lathe or other machine tool, such assembly comprising a substantially circular body having an outer cylindrical surface, a removable tool carrier including means to engage said tool and having a circular concave surface adapted to cooperate with the outer surface of he body, at least two axially extending, circumferentially spaced apart, interengageable key and groove means on the body and tool carrier at the said surfaces of the same and means to cause relative movement between one of the grooves in said tool carrier and the associated key in said body to secure the tool carrier to the body.

2. An assembly according to claim 1, wherein the key and groove means includes at least two radially extending keys on said body, the tool carrier being provided with corresponding grooves.

3. An assembly according to claim 2, wherein the key and groove means includes, in one of the grooves in the tool carrier, a dog movable into and out of clamping engagement with the associated key, an eccentric engaging said dog, and a rotatable operating member to adjust the eccentric.

4. An assembly according to claim 2, wherein at least one of the keys is movable circumferentially on the body.

5. An assembly according to claim 4, wherein which key and groove means includes separate arms on which two of said keys are mounted, the two arms meeting at a point, a cam which engages the arms and moves the arms towards and away from one another, and a rotatable operating member operating the cam to cause movement of the keys.

6. An assembly according to claim 1 comprising adjusting means to provide axial adjustment of the tool carrier on the body, said adjusting means including a slab in said body.

7. An assembly as claimed in claim 5 wherein said arms are provided with semiannular slots and said cam includes divergent elements engaged in said slots.

8. An assembly as claimed in claim 7 comprising a support supporting said cam elements and provided with a helical groove, said body having a recess in which the support is accommodated, and a tongue member supported by the body and extending into the helical groove, said operating member rotating the support which derives displacement from engagement of the tongue member in the helical groove.